May 10, 1949. J. P. KINZER 2,469,829
METHOD AND SYSTEM FOR MEASURING FREQUENCY
Filed July 13, 1946
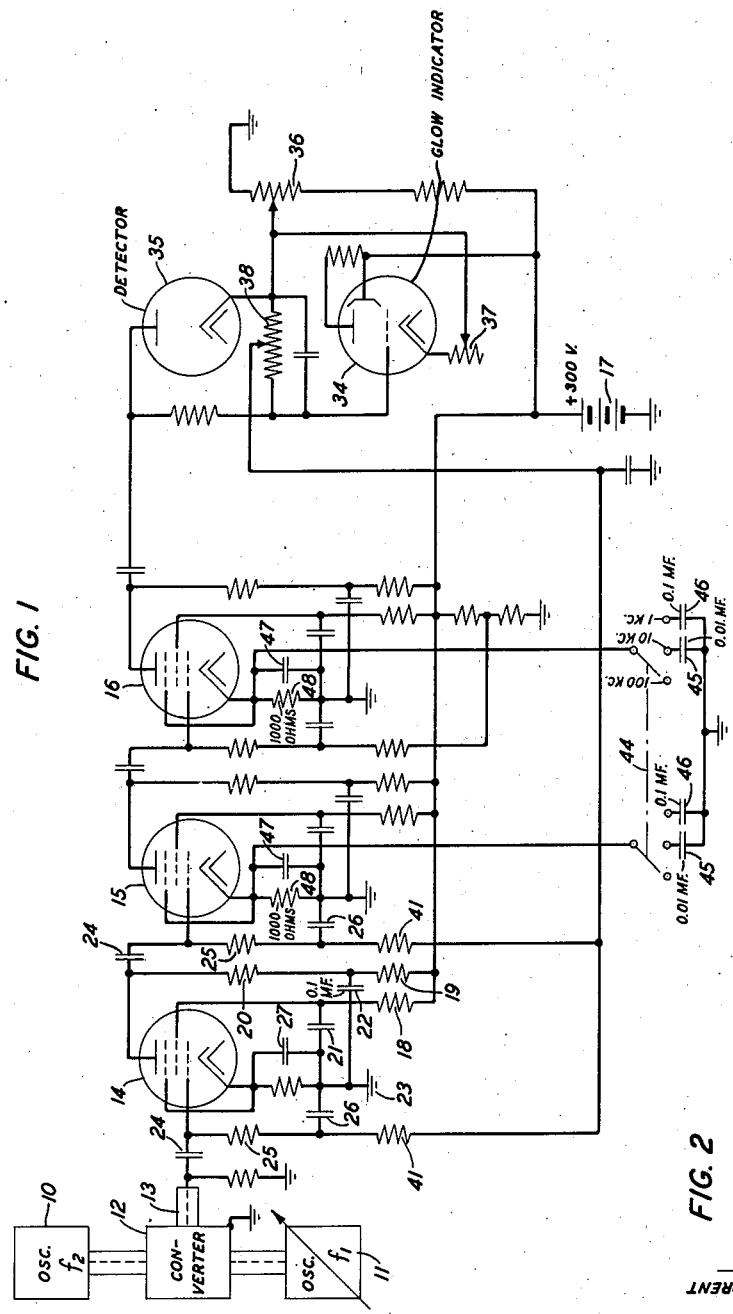
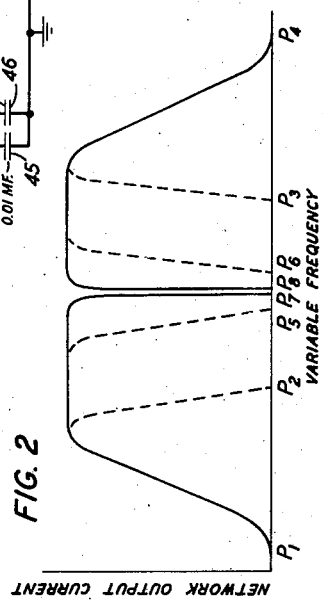
INVENTOR
J. P. KINZER
BY
E. V. Griggs
ATTORNEY Patented May 10, 1949

2,469,829

UNITED STATES PATENT OFFICE 2,469,829

METHOD AND SYSTEM FOR MEASURING FREQUENCY

John P. Kinzer, Ridgefield, N. J., assignor to Bell Telephone Laboratories, Incorporated, New York, N. Y., a corporation of New York Application July 13, 1946, Serial No. 683,307

6 Claims. (Cl. 250—39)

This invention relates to methods of and systems for measuring frequencies of electrical currents and more particularly for ascertaining the frequency of microwave oscillations.

An object of the invention is to enable the precision with which microwave frequencies are measured to be increased.

Another object of the invention is to expedite the measurement of very high frequencies.

A well-known method of determining an unknown frequency is to beat it against a variable, known standard frequency. The beat tone is then observed aurally, or by means of a cathode ray oscilloscope, and the frequency of the standard varied until zero beat is observed. At this zero beat condition, the frequency of the standard is the same as that of the unknown, within the accuracy that the zero beat condition can be set or observed. More generally, the zero beat may be made to occur using harmonics of the unknown and harmonics of the standard frequency.

However, in the case of microwave oscillations the range of the frequencies which the unknown oscillations may have may be so very great that the final indicator may not provide a sufficiently critical or arresting indication of the condition of zero beat to avoid passing over that condition without observing it if rapid tuning is attempted.

The method of the present invention takes advantage of the frequency transmission characteristic of a high-pass network. Such a network passes substantially no current from zero frequency up to the cut-off frequency. Above cutoff, substantially constant current is passed until the frequency becomes so high that secondary phenomena due to stray or parasitic elements become important.

Beat frequency systems, as is well known, provide two ranges of beat frequencies symmetrical about the zero beat condition. If the variable standard frequency $f_1$ commences at a point in the frequency range considerably below the unknown frequency $f_2$, the resulting beat frequency $f_2-f_1$ may be numerically high. As $f_1$ increases $f_2-f_1$ diminishes steadily until the frequencies $f_2$ and $f_1$ are equal and zero beat occurs. Thereafter as $f_1$ increases $f_1-f_2$ likewise increases beginning with zero and the beat frequencies pass through the same numerical values as before but in a rising range which is symmetrical with respect to the zero beat frequency point with the range below the zero beat condition.

If the beat frequency currents are applied to the high-pass network, the resulting current amplitude response at the output of the network is symmetrical about the zero beat condition. Starting with frequency $f_1$ at a suitable frequency lower than $f_2$ so that the resultant beat frequency $f_2-f_1$ is within the transmitting band of the network, the current response of the output of the network is large. As $f_1$ increases and the beat frequency $f_2-f_1$ decreases the transmission through the network remains substantially constant until the cut-off frequency is attained. At that frequency the output current response of the network drops precipitately to a negligible value at which it remains as the beat frequency diminishes down to the zero beat condition. As the frequency $f_1$ passes through the zero beat value the second or symmetrical range of beat frequencies begins, as has already been described. As $f_1$ rises beyond zero beat frequency the current transmission through the network remains negligible up to the point where the beat frequency $f_1-f_2$ is equal to the low-pass cutoff frequency. At that point the current output response of the network rises rapidly and thereafter remains substantially constant for a considerable range. Eventually parasitic elements result in a decrease of transmission through the network, when the beat frequency becomes very high.

This sequence of a peak magnitude response followed by a blank interval of substantially zero current response, and a second peak response is sufficiently marked in character to make it very distinctive. The low-pass cutoff of the network may originally be set sufficiently high to space the two maximum responses well apart in order to give a sufficient separation to preclude overlooking the valley of low response between them in the tuning operation. Whence once the valley has been observed the cutoff of the networks may be lowered to narrow the valley width and this process may be repeated until the zero beat condition is determined with considerable precision.

In the drawing,

Fig. 1 is a schematic circuit diagram of one embodiment of the invention in a frequency-determining system.

Fig. 2 illustrates the type of current response which is typical in the use of the frequency-determining method of this invention.

Referring to the drawing, the block 10 represents any source of microwaves of unknown frequency as, for example, a microwave oscillator the frequency of which is to be measured. A standard calibrated variable microwave oscillator 11 and the unknown frequency source 10 are both connected to the input of a converter or modulator 12 of any well-known type having a nonlinear characteristic so as to yield to the coaxial output circuit 13 resultant oscillations having a frequency equal to the beat or difference between the frequencies of the unknown source 10 and the known source. A crystal detector of the silicon type may be used as the converter.

The three-stage network comprising pentodes 14, 15 and 16, and their associated circuits connecting the pentode stages in tandem constitutes a combined gain-controlled amplifier and high-pass network; because of parasitic capacities in the vacuum tubes, the amplifier exhibits a high frequency cutoff in the vicinity of 1 megacycle.

The three stages may each comprise a 6AC7 vacuum tube with the customary high voltage supply source 17, screen isolation filter, 18 and 21, plate isolation filter 19 and 22 and interstage coupling circuit 20, 24 and 25. Each tube has a 1000 ohm biasing cathode resistor 48. For the second and third stages, the by-pass condenser around this cathode bias resistor is variable by virtue of gang switch 44 which permits the condenser 47 to be supplemented by addition in parallel of condensers 45 or 46. At low frequency the impedance of the condenser is high compared to that of the cathode resistor 48 and negative feedback reduces the gain of the stage. At higher frequencies, the condenser reactance drops to a low value and consequently the feedback is removed, and the stage gain is higher. With larger capacitors, the frequency at which feedback becomes effective is lower. An entirely similar performance could be attained by varying the grid blocking condensers 24 or the grid coupling resistors 25. However, connection of a gang switch to the grid connections of the vacuum tube results in an increase in the stray capacities and an undesirable decrease in the high frequency at which the amplifier gain begins to decrease.

The cathode by-pass condenser 27 of the first stage is made large to minimize the feedback in this stage and obtain a superior signal noise ratio on weak beat frequency signals. The output of the third stage pentode 16 is supplied to a diode detector 35, which also serves as a gain control tube. The direct current voltage developed across the load resistor 32 of the diode is proportional to the output of the three stage amplifier and is applied to the grid of the glow indicator tube 34. An adjustable portion of this direct current voltage is applied back to the grids of tubes 14 and 15 via automatic gain control filters comprising elements 41 and 26 to provide any desired amount of automatic gain control. The potentiometer 36 to which the cathodes of detector 35 and glow indicator tube 34 are connected serves to enable adjustment of the initial gain under the condition of no signal input. The variable resistor 37 in the space current path of glow tube 34 serves for adjustment of the sensitivity of the glow tube indicator. The glow indicator tube 34 which may be of the type disclosed in U. S. Patent to Wagner 2,051,189, August 18, 1936 serves to indicate a high response condition by a concentrated or well defined glow line and therefore shows when the beat frequency between the standard oscillator output and the unknown frequency falls within the pass range of the high-pass filter.

With the circuit connected as described, the amplifiers 14, 15 and 16 select and transmit beat frequencies in excess of 100 kilocycles. Beginning with that frequency higher beat frequency currents are transmitted by the three-stage network so that as is illustrated in the dotted line graph of Fig. 2, as the tuning of the calibrated oscillator 11 is varied in a rising direction between points $P_1$ and $P_2$ and the difference frequency $f_2-f_1$ diminishes, the response of the indicator tube 34 suddenly diminishes as the cutoff frequency $P_2=100$ kilocycles is passed remaining negligible until, after passing through the zero beat condition, the frequency $f_1$ becomes larger than $f_2$ and $f_1-f_2$ attains a value of about 100 kilocycles whereupon the response reappears at $P_3$. This is followed by a dwindling response toward $P_4$. This enables determination of the frequency of the oscillations received from source 10 to within 100 kilocycles as falling at a central point in the 200 kilocycle width valley occurring between the strong glow responses at points $P_2$ and $P_3$. A gang switch 44 may now be operated to connect the capacitors 45, each of 0.01 microfarad capacity, in parallel with capacitors 47 of the grid bias circuits of stages 15 and 16. This second setting of the gang switch reduces the cutoff to 10 kilocycles and enables the valley in the response to be narrowed to that shown by the points $P_5$ and $P_6$ as indicated by the broken line graph thus enabling a closer check to be made on the unknown frequency. Thereafter, a third positioning of the gang switch substitutes for capacitors 45, capacitors 46 of 0.1 microfarad. This reduces the low frequency cutoff to 1 kilocycle enabling the zero beat condition between the oscillations from source 10 and those from source 11 to be very nicely determined at the center of the 2 kilocycle range between points $P_7$ and $P_8$ of the solid line graph.

While the filter network has been referred to as a high-pass filter effectively it is a band-pass filter with an upper cutoff at about a megacycle. The high glow response is accordingly had only for beat frequencies of a megacycle or less. In microwave frequency measurements the system described, if tuning of the standard oscillator is rapidly effected, serves to give a characteristic response of two flashes or peaks separated by a valley.

What is claimed is:

1. A frequency measuring circuit having input terminals to which an electromotive force of unknown frequency may be applied, a source of known standard frequency oscillations connected to said terminals, said circuit including a converter to produce oscillations of the beat frequency between the impressed oscillations, a high pass network having a low-pass cut-off frequency in the region of 100 kilocycles, means for reducing the low-pass cut-off frequency of said network at will, and an indicator connected to said network to receive therefrom selected beat frequency oscillations.

2. The method of measuring the frequency of unknown frequency oscillations which comprises beating with them oscillations of a known frequency, sweeping the frequency of the known oscillations over a relatively wide range, causing the resulting beat frequency oscillations to produce discrete indications at frequency point equally above and below zero beat frequency, and successively reducing the frequency separation of the points at which said indications will appear.

3. A frequency measuring system comprising a converter having input terminals on which oscillations of unknown frequency to be measured may be impressed, a calibrated source of variable frequency oscillations electrically connected to said converter whereby oscillations of the difference frequency of said known and unknown oscillations may be produced, a selective network having input terminals connected to said converter to receive difference frequency oscillations therefrom, said network having a high-pass frequency selective characteristic, means for changing the low-pass cut-off frequency of said network at will, and an indicator electrically connected to output terminals of said network.

4. A frequency measuring circuit having input terminals to which an electromotive force of unknown frequency may be applied, a source of known standard frequency oscillations electrically connected to said terminals, a converter for producing oscillations of the beat frequency between the impressed oscillations also connected to said terminals, said converter having an output circuit including a high-pass network, said network including a multi-stage amplifier, a plurality of stages each having an independent feedback for controlling the gain thereof for frequencies above a predetermined low-pass cut-off frequency, means for simultaneously changing the low-pass cutoff of said amplifiers to a different cutoff frequency, and an indicator electrically connected to the output terminals of said network.

5. The method of measuring the frequency of oscillations of an unknown frequency which comprises beating said oscillations with oscillations produced by a variable but known frequency source, passing energy of the resultant beat frequency oscillations through a selective network having a band-pass characteristic to produce a valley between two response peaks as the known frequency oscillations are varied in frequency and repeating the operation after noting the response and reducing the low-pass cutoff frequency until the peak responses occur at closely adjacent frequencies.

6. The method of measuring the frequency of oscillations of an unknown frequency which comprises beating the unknown frequency oscillations with oscillations of a known frequency, sweeping the frequency of the known frequency oscillations through a range such as to cause the resulting beat frequency to decrease through zero and to again increase, passing the beat frequency oscillations through a frequency selective network having a rapid change in transmission efficiency in a limited frequency range, noting the points of rapid change preceding and following the zero beat condition, thereafter varying the selective network to reduce the frequencies at which it exhibits rapid change in transmission and again sweeping the frequency of the known frequency oscillations to enable observation of points of rapid change more closely spaced in frequency than before.

JOHN P. KINZER.

REFERENCES CITED

The following references are of record in the file of this patent:

UNITED STATES PATENTS

| Number | Name | Date |
| --- | --- | --- |
| 2,161,646 | Weyers | June 6, 1939 |
| 2,216,997 | Lewis | Oct. 8, 1940 |
| 2,240,450 | Wolfskill | Apr. 29, 1941 |
| 2,252,870 | Slonczewski | Aug. 19, 1941 |
| 2,256,073 | Carlson | Sept. 16, 1941 |
| 2,315,945 | Downey | Apr. 6, 1943 |
| 2,390,768 | Austin | Dec. 11, 1945 |

OTHER REFERENCES

"Radio Engineering," Terman, McGraw-Hill Book Co., 2nd edition, 1937, page 253, par. 2.